United States Patent
Vityuk et al.

(10) Patent No.: US 11,325,098 B2
(45) Date of Patent: May 10, 2022

(54) ADSORBENTS AND METHODS OF MAKING AND USING ADSORBENTS

(71) Applicant: BASF Corporation, Florham Park, NJ (US)

(72) Inventors: Artem Vityuk, Plainsboro, NJ (US);
Alfonse Maglio, River Edge, NJ (US);
Keenan Deutsch, Somerset, NJ (US);
Linda Hratko, Colonia, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/685,235

(22) Filed: Nov. 15, 2019

(65) Prior Publication Data

US 2020/0086294 A1 Mar. 19, 2020

Related U.S. Application Data

(62) Division of application No. 15/752,080, filed as application No. PCT/US2016/046537 on Aug. 11, 2016.

(Continued)

(51) Int. Cl.
*B01J 21/00* (2006.01)
*B01J 20/06* (2006.01)
(Continued)

(52) U.S. Cl.
CPC .............. *B01J 20/06* (2013.01); *B01D 53/64* (2013.01); *B01J 20/0259* (2013.01);
(Continued)

(58) Field of Classification Search
CPC . B01J 20/06; B01J 20/041; B01J 20/18; B01J 20/20; B01J 20/3236; B01J 20/0259; B01J 20/28069; B01J 20/3204; B01J 20/28057; B01J 20/28042; B01J 20/103; B01J 20/28078; B01J 20/28059; B01J 20/28061; B01D 53/64; B01D 2253/108; B01D 2253/102; B01D 2253/1124;
(Continued)

(56) References Cited

U.S. PATENT DOCUMENTS 4,869,735 A * 9/1989 Miyazawa ............. B01D 53/10
95/133
5,277,931 A 1/1994 Maglio et al.
(Continued)

FOREIGN PATENT DOCUMENTS

DE 3816599 C1 * 3/1989 ............. B01J 23/24
JP 2004091276 A 3/2004
(Continued)

OTHER PUBLICATIONS

Machine translation of DE3816599 (Year: 1989).*
(Continued)

*Primary Examiner* — Haytham Soliman
(74) *Attorney, Agent, or Firm* — Lowenstein Sandler LLP

(57) ABSTRACT

An absorbent composition having a bismuth material on a support containing at least one of a metal oxide, a metalloid oxide or an activated carbon and methods of making and using the same. The adsorbent composition is usful for adsorbing arsine from a fluid stream.

12 Claims, 4 Drawing Sheets

Related U.S. Application Data

(60) Provisional application No. 62/205,155, filed on Aug. 14, 2015.

(51) Int. Cl.
| | |
|---|---|
| *B01D 53/64* | (2006.01) |
| *B01J 20/32* | (2006.01) |
| *B01J 20/28* | (2006.01) |
| *B01J 20/10* | (2006.01) |
| *B01J 20/04* | (2006.01) |
| *B01J 20/18* | (2006.01) |
| *B01J 20/20* | (2006.01) |
| *B01J 20/02* | (2006.01) |

(52) U.S. Cl.
CPC .......... *B01J 20/041* (2013.01); *B01J 20/103* (2013.01); *B01J 20/18* (2013.01); *B01J 20/20* (2013.01); *B01J 20/28042* (2013.01); *B01J 20/28057* (2013.01); *B01J 20/28069* (2013.01); *B01J 20/28078* (2013.01); *B01J 20/3204* (2013.01); *B01J 20/3236* (2013.01); *B01D 2253/102* (2013.01); *B01D 2253/108* (2013.01); *B01D 2253/1124* (2013.01); *B01D 2257/55* (2013.01); *B01D 2258/0283* (2013.01)

(58) Field of Classification Search
CPC ........ B01D 2257/55; B01D 2258/0283; B01D 2257/60; B01D 2253/25
USPC ...................................................... 502/242
See application file for complete search history.

(56) References Cited

U.S. PATENT DOCUMENTS

| | | | |
|---|---|---|---|
| 5,911,961 A | 6/1999 | Horiuchi et al. | |
| 6,030,537 A | 2/2000 | Shaniuk et al. | |
| 6,752,919 B2 | 6/2004 | Farha et al. | |
| 2004/0109821 A1 | 6/2004 | Koyanaka et al. | |
| 2008/0003155 A1 | 1/2008 | Jia et al. | |
| 2011/0189069 A1 | 8/2011 | Kato et al. | |
| 2014/0001125 A1 | 1/2014 | El-Safty et al. | |

FOREIGN PATENT DOCUMENTS

| | | |
|---|---|---|
| RU | 2032460 | 4/1995 |
| RU | 2336946 | 10/2008 |
| SU | 889062 | 12/1981 |
| SU | 1551659 A1 | 3/1990 |
| WO | 2011021024 | 2/2011 |

OTHER PUBLICATIONS

Devillers et al. "Bismuth Carboxylates as Precursors for the Incorporation of Bismuth in Oxide-based Materials" Journal of Solid State Chemistry, vol. 126, Issue 2, Nov. 1, 1996, pp. 152-160 (Year: 1996).*

Shamaila et al. "Study on highly visible light active Bi2O3 loaded ordered mesoporous titania" Applied Catalysis B: Environmental, vol. 94, Issues 3-4, Feb. 10, 2010, pp. 272-280 (Year: 2010).*

International Search Report and Written Opinion for the International Searching Authority for PCTUS2016/046537 dated Dec. 15, 2016, 23 pages.

Supplementary Partial European Search Report for Application No. 16837544.2 dated Mar. 27, 2019, 14 pages.

Dollard et al., "Two-dimensional bismuth+ arsenic alloys supported on Pt( 111): an electrochemical study", Feb. 15, 1993, Journal of Electroanalytical Chemistry and Interfacial Electrochemistry, vol. 345, No. 1-2, 17 pages.

Lidin R.A. et al., "Inorganic Reaction Chemistry", Handbook, Moscow, 2007, p. 63-70, Chapter "Bismuth", 3 pages.

* cited by examiner

ADSORBENTS AND METHODS OF MAKING AND USING ADSORBENTS

CROSS-REFERENCE TO RELATED APPLICATION(S)

This application is a divisional of U.S. Non-Provisional patent application Ser. No. 15/752,080, filed on Feb. 12, 2018, which is a national phase of International Application No. PCT/US2016/046537, filed on Aug. 11, 2016, which claims the benefit of U.S. Provisional Patent Application No. 62/205,155, filed on Aug. 14, 2015. The contents of these applications are hereby incorporated by reference in their entirety.

FIELD

The disclosure relates to adsorbents and methods of making and using adsorbents. According to various example aspects, the adsorbents include an active material such as an active metal oxide (e.g., elemental bismuth or a bismuth compound such as a bismuth oxide) on a support comprised of a metal oxide (e.g., a high surface area metal oxide, such as a titanium oxide), a metalloid oxide or an activated carbon and methods of making and using the same.

BACKGROUND

The removal of impurities Irons the process and exhaust streams of industrial processes is extremely important to reduce pollutants and toxins emitted into the environment, recover valuable byproducts, maintain the performance of downstream operations and ensure the safety of workers. Such industrial processes include petroleum, petrochemical, polymerization, synthesis gas ("Syngas") and semiconductor processes.

Hydrocarbon process streams, in particular, refinery off gas ("ROG") streams may contain reactive compounds that induce exotherms and/or produce further non-desirable compounds (e.g., acetylide, green oil/cuprene, etc.). Such reactive compounds include acetylene, methyl acetylene and propadiene ("MAPD") as well as hydrogen and carbon monoxide.

Adsorbents containing lead oxide are often used to remove arsine and carbonyl sulfide ("COS") from hydrocarbon streams containing reactive compounds (e.g., acetylene and MAPD) or streams with significant reducing capacity such as hydrogen-containing streams. Lead oxide, however, imposes substantial environmental and health concerns and can affect individual organisms and threaten ecosystems. Therefore, it is of interest to employ alternative materials that would enable safe handling, operation, and disposal of adsorbents. Adsorbents containing copper oxide are also used to remove arsine from hydrocarbon streams. However, copper has a tendency to form acetylides and to promote green oil formation, such that copper oxide adsorbents are primarily employed in "non-reactive" streams containing small concentrations or no acetylene, MAPD, diene, etc. Moreover, in addition to the environmental health and safety concerns mentioned above, lead oxide-based media are generally characterized by somewhat lower capacity towards arsine as compared to copper-based materials.

Therefore, there is a need for alternative and/or improved adsorbents having a higher adsorption capacity of targeted reactive compounds (e.g., an arsenic material such as arsine or arsenic-containing compounds), no hydrogenation capacity to minimize exotherm risk, and that do not form further non-desirable compounds, such as, acetylide or green oil/cuprene, for example.

BRIEF SUMMARY

According to various example aspects, the disclosure relates to an adsorbent composition, comprising: a bismuth material on a support, the support comprising at least one of a metal oxide, a metalloid oxide or an activated carbon; and an arsenic material. The bismuth material can be any bismuth-containing material including elemental bismuth and bismuth compounds. For example, the bismuth material can be a bismuth oxide such as bismuth (III) oxide ($Bi_2O_3$). In certain example aspects, the bismuth oxide can be derived from a precursor such as an organic bismuth compound, an inorganic bismuth compound, an organic bismuth salt, an inorganic bismuth salt and combinations thereof. For example, the bismuth oxide can be at least partially derived from a bismuth citrate precursor, a bismuth nitrate precursor or a combination thereof. The adsorbent composition can include about 0.1% to about 2% by mass, or about 2% to about 50% by mass, or about 5% to about 1.5% by mass, or about 8% to about 11% by mass of the bismuth material.

In example certain aspects, the support can be a metal oxide such as a high surface area metal oxide. For example, the metal oxide can be a titanium oxide, a cerium oxide, an aluminum oxide, a silicon oxide, zirconium oxide, magnesium oxide, zeolites, activated carbon and mixtures thereof. The support can further include silicon dioxide ($SiO_2$). In certain aspects, the adsorbent composition can include at least 5% by mass, or at least 50% by mass, or at least 75% by mass of the metal oxide. According to various example aspects, the metal oxide of the support can include particles having a size of about 1 μm to about 10 mm. The metal oxide on the support can have a surface area of about 20 $m^2/g$ to about 600 $m^2/g$, or about 50 $m^2/g$ to about 600 $m^2/g$, or about 250 $m^2/g$ to about 350 $m^2/g$. The adsorbent composition of claim 1, wherein the adsorbent composition further comprises on the support at least one compound selected from a group consisting of a silver oxide, an iron oxide, a manganese oxide, a cerium oxide, a vanadium oxide, a tin oxide and mixtures thereof. In yet further example aspects, the support can have a pore volume of about 0.01 cc/g to about 5 cc/g, or about 0.2 cc/g to about 1 cc/g. Additionally, the support can have a pore size of about 1 Å to about 750 Å, or about 10 Å to about 500 Å. In certain aspects, the support includes a moisture content of about 15% by mass or less or the support is moisture-free.

The arsenic material can be any arsenic-containing material such as elemental arsenic and arsenic compounds. The adsorbent composition can include about 0.01% to about 20% by mass, or about 0.1% to about 15% by mass or about 0.5% to about 7% by mass of the arsenic material.

In certain example aspects of the disclosure, the adsorbent composition can have a lead content of about 5% by mass or less or the adsorbent composition can be lead-free. The adsorbent can be a tablet, an extrudate, a pellet, a rod, a molding and/or a monolith.

According to various example aspects of the disclosure, the adsorbent composition can have an arsine removal efficiency of about 90% or more as measured by a dry colorimetry method using an arsine analyzer. In further example aspects, the adsorbent composition can have an arsine removal efficiency of about 100% as measured by a dry colorimetry method using an arsine analyzer.

According to further example aspects, the disclosure relates to an adsorbent composition, comprising: a mixture of a bismuth oxide and at least one active metal oxide on a support, wherein the at least one active metal oxide is selected from a group consisting of a silver oxide, an iron oxide, a manganese oxide, a cerium oxide, a vanadium oxide, a tin oxide and mixtures thereof, and wherein the bismuth oxide is at least partially derived from a bismuth salt precursor.

In further example aspects, the disclosure relates to a method of making an adsorbent composition, comprising: dispersing a bismuth oxide on a support comprising a metal oxide, wherein the support is contacted with a precursor comprising a bismuth salt. In certain example aspects, the metal oxide can be a titanium oxide, a cerium oxide, an aluminum oxide, a silicon oxide, magnesium oxide, zeolites or a mixture thereof. The bismuth salt precursor can be bismuth citrate, bismuth carboxylate or a mixture thereof. Dispersing bismuth oxide on the support can include impregnating the bismuth oxide in the support. In certain aspects, the support can include titanium dioxide in an anatase form.

In yet further example aspects, the disclosure relates to a method of adsorbing an arsenic material, comprising: contacting an arsenic-containing fluid with an adsorbent composition, the adsorbent composition comprising: a bismuth material on a support comprising at least one of a metal oxide, a metalloid oxide or an activated carbon. The bismuth material can be any bismuth-containing material including elemental bismuth and bismuth compounds. For example, the bismuth material can be a bismuth oxide such as bismuth (III) oxide ($Bi_2O_3$). In certain example aspects, the bismuth oxide can be derived from a precursor such as an organic bismuth compound, an inorganic bismuth compound, an organic bismuth salt, an inorganic bismuth salt, and combinations thereof. For example, the bismuth oxide can be at least partially derived from a bismuth citrate precursor, a bismuth nitrate precursor or a combination thereof. The adsorbent composition can include about 0.1% to about 2% by mass, or about 2% to about 50% by mass, or about 5% to about 15% by mass, or about 8% to about 11% by mass of the bismuth material.

In example certain aspects, the support can be a metal oxide such as a high surface area metal oxide. For example, the metal oxide can be a titanium oxide, a cerium oxide, an aluminum oxide, a silicon oxide, zirconium oxide, magnesium oxide, zeolites, activated carbon and mixtures thereof. The support can further include silicon dioxide ($SiO_2$). In certain aspects, the adsorbent composition can include at least 5% by mass, or at least 50% by mass, or at least 75% by mass of the metal oxide. According to various example aspects, the metal oxide of the support can include particles having a size of about 1 μm to about 10 mm. The metal oxide on the support can have a surface area of about 20 $m^2/g$ to about 600 $m^2/g$, or about 50 $m^2/g$ to about 600 $m^2/g$, or about 250 $m^2/g$ to about 350 $m^2/g$. The adsorbent composition of claim 1, wherein the adsorbent composition further comprises on the support at least one compound selected from a group consisting of a silver oxide, an iron oxide, a manganese oxide, a cerium oxide, a vanadium oxide, a tin oxide and mixtures thereof. In yet further example aspects, the support can have a pore volume of about 0.01 cc/g to about 5 cc/g, or about 0.2 cc/g to about 1 cc/g. Additionally, the support can have a pore size of about 1 Å to about 750 Å, or about 10 Å to about 500 Å. In certain aspects, the support includes a moisture content of about 15% by mass or less or the support is moisture-free.

The arsenic material can be any arsenic-containing material such as elemental arsenic and arsenic compounds. The adsorbent composition can include about 0.01% to about 20% by mass, or about 0.1% to about 15% by mass or about 0.5% to about 7% by mass of the arsenic material.

In certain example aspects of the disclosure, the adsorbent composition made by the above method can have a lead content of about 5% by mass or less or the adsorbent composition can be lead-free. The adsorbent composition can be a tablet, an extrudate, a pellet, a rod, a molding and/or a monolith.

According to various example aspects of the disclosure, the adsorbent composition made by the above met hod can have an arsine removal efficiency of about 90% or more as measured by a dry colorimetry method using an arsine analyzer. In further example aspects, the adsorbent composition can have an arsine removal efficiency of about 100% as measured by a dry colorimetry method using an arsine analyzer.

In certain example aspects, the process stream can be a part of a petroleum process, a petrochemical process, a polymerization process, a synthesis gas processor a semiconductor process. In yet further example aspects, the process stream can be a part of a petrochemical process, the process stream comprising natural gas. For example, the process stream can include a gas such as refinery off-gas, fluid catalytic cracking off-gas, steam cracker off-gas, shale gas and combinations thereof, the gas containing reactive components comprising at least one of acetylene, methyl acetylene and propadiene.

In various example aspects, the disclosure is directed to an adsorbent composition, comprising: a bismuth oxide on a support comprising a metal oxide, wherein the bismuth oxide may be derived from a bismuth citrate precursor.

According to further example aspects, the disclosure relates to an adsorbent, comprising: a bismuth material on a support comprising a titanium oxide; and an arsenic material adsorbed onto a surface of the adsorbent.

In further example aspects, the disclosure is directed to an adsorbent composition, comprising: a mixture of a bismuth oxide and at least one active material, such as an active metal oxide on a support, wherein the at least one active metal oxide is selected from a group consisting of a silver oxide, an iron oxide, a manganese oxide, a cerium oxide, a vanadium oxide, a tin oxide and mixtures thereof, and wherein the bismuth oxide may be derived from any suitable source of bismuth including bismuth inorganic salts, bismuth organic salts, bismuth oxide powder and bismuth citrate precursor.

In yet further example aspects, the disclosure is directed to a method of making an adsorbent composition, comprising: dispersing a bismuth oxide on a support comprising a metal oxide comprising contacting the support with a precursor comprising any suitable source of bismuth including bismuth inorganic salts, bismuth organic salts, bismuth oxide powder and bismuth citrate.

According to further example aspects, the disclosure is directed to a method of adsorbing arsine, comprising: contacting an arsine-containing fluid with an adsorbent comprising: a bismuth oxide on a support comprising a titanium oxide, wherein the bismuth oxide may be derived front any suitable source of bismuth including bismuth inorganic salts, bismuth organic salts, bismuth oxide powder and a bismuth citrate precursor.

In yet further example aspects, the disclosure is directed to an adsorbent, comprising: a bismuth oxide on a support comprising a titanium oxide; and arsine adsorbed onto a surface of the adsorbent.

Although the present invention can be used to purify any appropriate fluid stream containing arsine or its compounds, the invention is particularly effective in the purification of hydrocarbon streams, in particular, olefins (i.e., ethylene, propylene), fluid catalytic cracking (FCC) off-gas, refinery off-gas, petroleum fractions and natural gas. In certain embodiments, the arsine removal process is carried out by passing a fluid containing arsine compound through the adsorbent fixed bed. The process can be carried out in a liquid phase or a gas phase. Non-limiting process conditions comprise temperatures from ambient to about 130° C. and pressures from about 1 atm to about 25 atm. In certain embodiments, liquid-phase processes are performed at LHSV from about 1 to about 10 $h^{-1}$ while gas phase processes are carried out at GHSV from about 1,000 to about 10,000 $h^{-1}$. Arsine concentrations in the feed stream may depend on a nature of the feed but most generally range, e.g., from about 0.1 to 5 ppm. Arsine concentration in effluent stream after purification stage may be in a range, e.g., from 0 to 20 ppb.

The above summary provides a basic understanding of the disclosure. This summary is not an extensive overview of all contemplated aspects, and is not intended to identify all key or critical elements or to delineate the scope of any or all aspects of the disclosure. Its sole purpose is to present one or more aspects in a summary form as a prelude to the more detailed description that follows and the features described and particularly pointed out in the claims.

DETAILED DESCRIPTION

Figure 1:
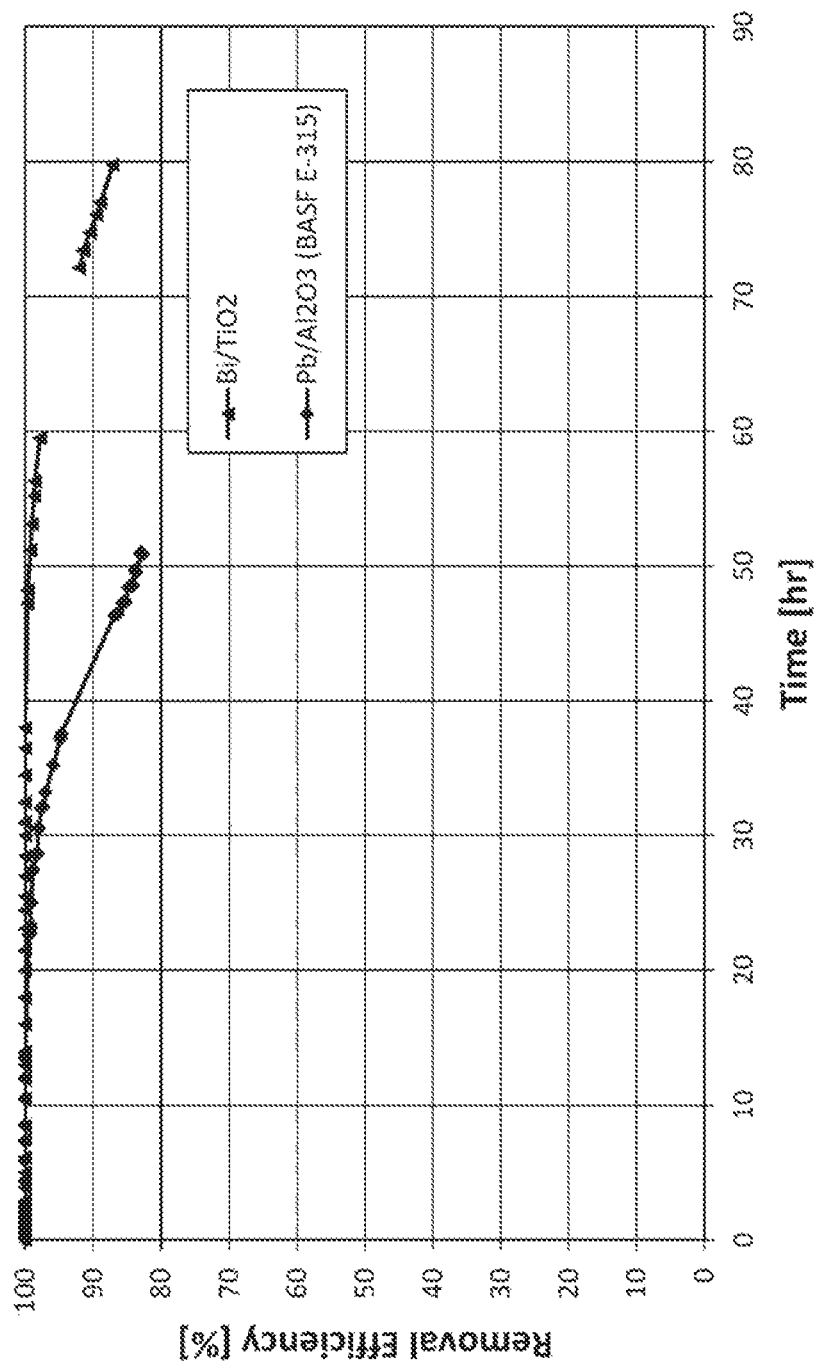
FIG. 1 shows a comparison of a bismuth oxide on titanium oxide adsorbent with a lead oxide on aluminum oxide adsorbent for removing arsine in accordance with various example aspects of the disclosure.

Example aspects am described herein in the context of adsorbents and methods of making and using adsorbents. Those of ordinary skill in the an will recognize that the following description is illustrative only and is not intended to be in any way limiting. Other aspects will readily suggest themselves to those of ordinary skill in the art having the benefit of this disclosure. Reference will now be made in detail to implementations of the example aspects as illustrated in the accompanying drawings. The same reference indicators will be used to the extent possible throughout the drawings and the following description to refer to the same or like items.

According to various example aspects, the disclosure is directed to adsorbents (for both liquids and gases) having an active material such as an active metal oxide on a support containing an activated carbon, a metalloid oxide or a metal oxide, for example, a high surface area metal oxide. Suitable active metal oxides include, but are not limited to a bismuth oxide ($Bi_xO_y$), a silver oxide ($Ag_xO_y$), an iron oxide ($Fe_xO_y$), a manganese oxide ($Mn_xO_y$), a cerium oxide ($Ce_xO_y$), a vanadium oxide ($V_xO_y$), a tin oxide ($Sn_xO_y$) and mixtures thereof, wherein x and y are integers. Suitable metal oxides (e.g., high surface area metal oxides) for the support include, hut are not limited to, a titanium oxide ($Ti_xO_y$), a cerium oxide ($Ce_xO_y$), an aluminum oxide ($Al_xO_y$), a silicon oxide ($Si_xO_y$), magnesium oxide, alumo-silicates/zeolites and combinations thereof, wherein x and y are integers. For example, the adsorbent may contain a bismuth material, for example, elemental bismuth or a bismuth oxide ($Bi_xO_y$) on a support containing a titanium oxide ($Ti_xO_y$). In certain aspects, the adsorbent may contain bismuth (III, V) oxides on a support containing titanium dioxide ($TiO_y$), for example. In yet further example aspects, the adsorbent may contain bismuth (III) oxide ($Bi_2O_3$) as the sole active agent on a support containing $TiO_2$.

The amount of the active material, for example, active metal oxide, per total weight of the adsorbent may vary depending on the type and anticipated concentration (in the process stream) of the reactive compound(s) to be adsorbed. The concentration of active material, for example, active metal oxide, per total weight of the adsorbent may be, for example, about 2 wt % to about 50 wt %. In certain example aspects, the concentration of the active material, for example, active metal oxide may be about 5 wt % to about 40 wt %, about 5 wt % to about 15 wt %, or about 8 wt % to about 11 wt %. In certain aspects, the concentration of the active agent may be about 9.4 wt %.

In accordance with various example aspects of the disclosure, the adsorbent may contain about 5 wt % or less of lead oxide as the active material, for example, active metal oxide, in certain example aspects the lead content may be about 4 wt %, about 3 wt %, about 2 wt % or about 1 wt %. The adsorbent may also he lead-free. The term "lead-free" will be understood to mean that the adsorbent contains only trace amounts of lead e.g., about 10,000 ppm or less, or about 5,000 ppm or less, or about 1000 ppm or less, or about 500 ppm or less, such that the lead content may be zero or undetectable as measured by, for example, an X-ray fluorescence ("XRF") spectrometer. Other techniques and instruments known to those of ordinary skill in the art for measuring trace amounts of lead may also be used.

The support may be formed from one or more metal oxide, metalloid oxide or activated carbon. For example, where the active material is an active metal oxide and is on a support containing a titanium oxide, the support may be formed from only the titanium oxide. In certain example aspects, the support may contain the titanium oxide in addition to one or more other metal oxide. For example, the support may contain at least 50 wt % of a titanium oxide ($Ti_xO_y$), or the support may contain at least 75 wt % of a titanium oxide ($Ti_xO_y$) with the balance being one or more other metal oxide, for example, a silver oxide ($Ag_xO_y$), an iron oxide ($Be_xO_y$), a manganese oxide ($Mn_xO_y$), a cerium oxide ($Ce_xO_y$), a vanadium oxide ($V_xO_y$), a tin oxide ($Sn_xO_y$) and combinations thereof. The metal oxide for the support may be in any crystalline form. For example, the titanium oxide may be titanium dioxide in anatase, brookite or rutile form. In certain aspects, the titanium oxide may be in anatase form. In certain embodiments, the metalloid oxide may be silicon dioxide (SiO2). In other embodiments, the support may comprise activated carbon.

The characteristics of the support may have a significant effect on the performance of the adsorbent to remove a reactive compound from a process stream. The support characteristics may facilitate high dispersion of the active material on a surface of the support and may maintain such dispersion through the adsorption process. In various example aspects of the disclosure, the support may have a surface area of about 10 m$^2$/g to about 600 m$^2$/g, about 20 m$^2$/g to about 300 m$^2$g or about 250 m$^2$/g to about 350 m$^2$/g. For example, the surface area may be about 290 m$^2$/g (e.g., for TiO$_2$G5). The support may have a pore volume of about 0.01 cc/g to about 5 cc/g, or about 0.2 cc/g to about 1 cc/g. For example, the pore volume may be about 0.4 cc/g (e.g., for TiO$_2$G5). Additionally, the support may have a pore size of about 1 to about 750 Å, or about 10 to about 500 Å. For example, the support may have a pore size of about 55 Å (e.g., for TiO$_2$G5). These and other characteristics can be optimized by those of ordinary skill in the art based on the type and concentration of the reactive compounds to be adsorbed and the composition of the adsorbent.

The moisture content of the support may also critically affect the performance of the adsorbent to adsorb a reactive compound from a process stream. In accordance with various example aspects, the support may have a moisture content of about 15 wt % or less. In certain aspects, the support may be moisture-free. The term "moisture-free" will be understood to mean that the support contains only trace amounts of water, e.g., about 5 wt % or less, or about 1 wt % or less, or about 0.5 wt % or less or about 0.1 wt % or less such that the moisture content may be zero or undetectable as measured by, for example, a Thermogravimetrk analyzer ("TGA"). Other techniques and instruments known to those of ordinary skill in the art for measuring trace amounts of water may also be used.

According to various example aspects of the disclosure, adsorbent compositions containing bismuth oxide (e.g., about 9.4 wt % bismuth (III) oxide derived from a citrate precursor) on a titanium oxide support may have a removal efficiency of amine of about 100% for a period of about 45 hours or longer. Even after about 80 hours, the removal efficiency of the adsorbent may be about 85% or more. For an adsorbent containing bismuth oxide (e.g., about 9.4 wt % bismuth (III) oxide) derived from a nitrate precursor on a titanium oxide support, the arsine removal efficiency may be 100% for about 36 hours or longer and may be at about 78% even after about 56 hours.

The adsorbents described herein may be manufactured by any suitable means known to those of ordinary skill in the art For example, active material, for example, active metal oxide, particles may be formed in pores of the support by active material, for example, metal oxide, precursor impregnation, precipitation, deposition or strong electrostatic adsorption and/or any other method known to those of ordinary skill in the art, followed by calcination to decompose the active material, for example, metal oxide, precursor. Alternatively, the active material, for example, active metal oxide, can comprise some fraction of a physical mixture of active material, for example, active metal oxide, and a high surface area substrate and/or a binder. Where the adsorbent is intended to contain a bismuth material such us elemental bismuth or bismuth oxide as the active material, for example, active metal oxide, any suitable bismuth precursor can be used. For example, a bismuth precursor derived from organic acid salts/complexes (e.g., citrates, nitrates, etc.) and inorganic acid salts can be used. A bismuth citrate precursor, in particular, can lower the calcination temperature and suppress the sintering of the bismuth oxide at high temperatures (e.g., during high temperature calcination). The adsorbents can be manufactured in any suitable form, for example, as tablets, extrudates, pellets, rod, moldings, monoliths, etc. in various shapes and sizes.

According to various example aspects, also disclosed are methods for removing impurities, for example, an arsenic material such as arsine, elemental arsenic and arsenic derivatives from a process stream (liquid or gas) using the adsorbents. The process stream may be from, for example, a petroleum, petrochemical, polymerization, synthesis gas ("Syngas") and semiconductor process. For instance, the process may be a refinery oil gas ("ROG") process, a fluid catalytic cracking ("FCC") off-gas process, a stem cracker off-gas process, a natural gas process and/or a shale gas process. The process streams may contain one or more reactive compounds including, but not limited to, acetylene and propadiene ("MAPD") or components with significant reducing capacity such as hydrogen. The process streams may contain alkenes, carbon monoxide, carbon dioxide, nitrogen oxides (NO$_x$), oxygen, thiol, hydrogen sulfide and sulfur oxides (SO$_x$), carbonyl sulfide (COS), mercaptans and other sulfur compounds. In certain example aspects, a process steam may contain, for example, arsine at a concentration of about 0.1 ppmw to about 100 ppmw, or about 0.1 ppmw to about 0.5 ppmw.

According to various example aspects, the adsorbents may be used as materials in any suitable equipment, including, but not limited to packed bed columns, fluidized beds, monoliths, cartridge filters, semiconductor process tools, and other equipment known to those of ordinary skill in the art. Methods for removing a reactive compound from a process stream using the adsorbents (e.g., adsorption processes) may be operated at any suitable temperature. For example, an adsorption process may operate at about 10° C. to about 150° C., about 20 C. to about 100° C. or about 20° C. to about 80° C. In certain aspects, if the process stream is a liquid, the adsorption process may operate at a temperature of about 50° C.; for a gas stream the adsorption process may operate at a temperature of about 130° C. The operating pressure of the adsorption process may be, for example, about 1 bar to about 100 bar, about 1 bar to about 50 bar, or about 1 bar to about 20 bar. For a liquid phase process stream the gas hourly space velocity ("GHSV") may be about 20 h$^{-1}$ or less and for a gas phase process stream the GHSV may be about 10,000 h$^{-1}$.

EXAMPLES

Example 1A

Synthesis of Bismuth Oxide on Titanium Oxide (Bi/TiO$_2$) Adsorbent Derived From Bismuth Citrate Bi/TiO$_2$ adsorbent was prepared using an incipient wetness impregnation method. More specifically, 4.95 grants of bismuth citrate was dissolved in 30 grams of ammonium hydroxide (29% NH$_4$OH) and resultant solution was mixed for about 30 minutes until full dissolution of the bismuth citrate has been observed. An amount of this solution was impregnated on a dry titanium oxide (Anatase) powder to achieve 91% pore volume fill of the earlier. The resultant powder was dried overnight at 110° C. and calcined at 400° C. for 2 hours to yield a Bi loading of about 9.4 wt % as determined by inductively coupled plasma spectrometry ("ICP"). Thermogravimetric Analysis ("TGA") measurements confirmed full decomposition of the bismuth citrate in a calcined powder while x-ray photoelectron spectroscopy ("XPS") indicated the presence of Bi in +3 oxidation state suggesting Bi$_2$O$_3$ as a primary compound of Bi in a material.

Example 1B

Synthesis of Bismuth Oxide on Titanium Oxide (Bi/TiO$_2$) Adsorbsent Derived From Bismuth Nitrate Bi/TiO$_2$ adsorbent was prepared using an incipient wetness impregnation method. Bismuth nitrate stock solution (22.3 wt % Bi) was used as the Bi source. An amount of this solution was impregnated on a dry titanium oxide (Anatase) powder to achieve 97% pore fill of the carrier. The resultant powder was dried overnight at 110° C. and calcined at 400° C. for 2 hours to yield Bi loading of about 9.7 wt % as determined by ICP. Complete decomposition of the bismuth nitrate precursor in the calcined material was confirmed with TGA. XPS measurements also confirmed Bi +3 as a major form of Bi in a resultant material.

Example 1C

Comparison of a Bismuth Oxide on Titanium Oxide Adsorbent (Bi/TiO$_2$) With a Lead Oxide on Aluminum Oxide Adsorbent (Pb/Al$_2$O$_3$) (Prior Art7) for Removing Arsine Experimental Conditions:

About 1 cubic centimeter of an adsorbent containing bismuth oxide on titanium dioxide (prepared as described above) was loaded into a reactor. A fluid containing about 100 ppmw of arsine in propane was passed through the reactor and over the adsorbent for a period of time at a liquid hourly space velocity ("LHSV") of 10 h$^{-1}$. The fluid was at ambient temperature, liquid phase about 220 psig. Arsine was adsorbed onto the adsorbent from the fluid. The experiment was repeated at the same conditions with about 1 cubic centimeter of an adsorbent containing lead oxide on aluminum oxide (approximately 20 wt % PbO) loaded into the reactor. The results are shown in FIG. 1.

As shown in FIG. 1, the removal efficiency (%) of arsine as a function of time was comparable for both adsorbents at 100% for about 22 hours. However, thereafter, the removal efficiency of the Pb/Al$_2$O$_3$ began to decline while the removal efficiency of the Bi/TiO$_2$ remained at 100% until about 45 hours. At about 52 hours, the removal efficiency of the Pb/Al$_2$O$_3$ decreased to about 83% whereas the removal efficiency of the Bi/TiO$_2$ remained high at about 99%. Even after another about 30 hours, the removal efficiency of the Bi/TiO$_2$ not declined to that of the Pb/Al$_2$O$_3$. The arsenic content was measured in spent Bi/TiO$_2$ and Pb/Al$_2$O$_3$ materials and was found to be 4.2 wt % and 2.4 wt %, respectively.

Example 2

Comparison of a Bismuth Oxide (Derived From a Titrate Precursor) on Titanium Oxide Adsorbent (Bi/TiO$_2$ (citrate)) With a Bismuth Oxide (Derived From a Nitrate Precursor) on Titanium Oxide Adsorbent (Bi/TiO$_2$ (nitrate)) and a Lead Oxide on Aluminum Oxide Adsorbent (Pb/Al$_2$O$_3$) (Prior Art) for Removing Arsine Experimental Conditions:

About 1 cubic centimeter of an adsorbent containing bismuth oxide derived from a citrate precursor on titanium oxide was loaded into a reactor. A fluid containing about 100 ppmw of arsine in propane was passed through the reactor and over the adsorbent for a period of time at a liquid hourly space velocity ("LHSV") of 10 h$^{-1}$. The fluid was at ambient temperature (25° C.), liquid phase about 220 psig. Arsine was adsorbed onto the adsorbent from the fluid. The experiment was repeated at die same conditions with about 1 cubic centimeter of an adsorbent containing bismuth derived from a nitrate precursor on titanium oxide and again with about 1 cubic centimeter of an adsorbent containing lead on aluminum oxide. The results are shown in FIG. 2.

Figure 2:
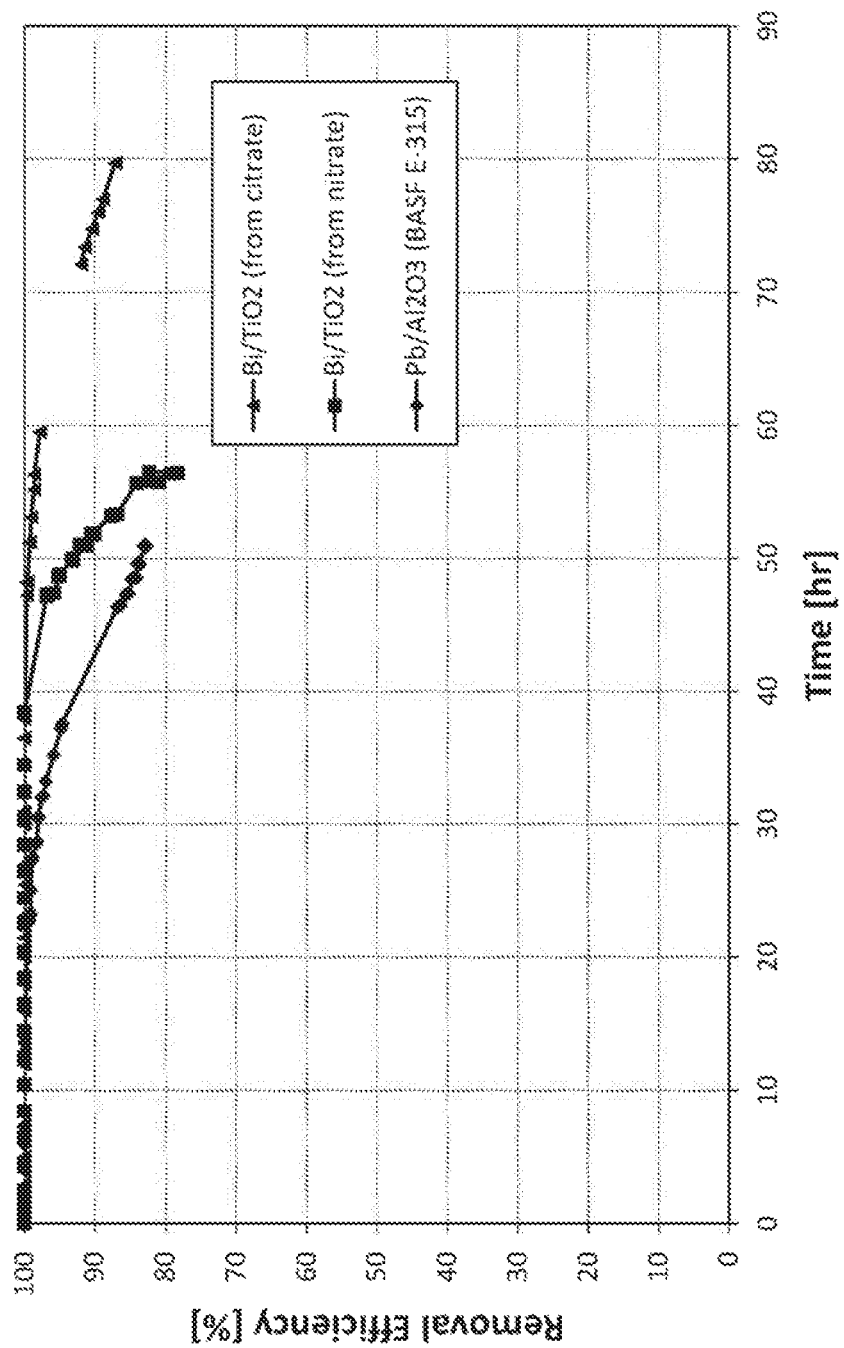
FIG. 2 shows a comparison of bismuth oxide on titanium oxide adsorbents with a lead oxide on aluminum oxide adsorbent for removing arsine in accordance with various example aspects of the disclosure.

As shown in FIG. 2, the removal efficiency (%) of arsine as a function of time was comparable for all three adsorbents for about 22 hours. However, thereafter, the removal efficiency of the Pb/Al$_2$O$_3$ began to decline while the removal efficiency of the Bi/TiO$_2$ (citrate) and the Bi/TiO$_2$ (nitrate) remained at 100% until about 38 hours. At this time, the removal efficiency of the Bi/TiO$_2$ (nitrate) began to decline, while the removal efficiency of the Bi/TiO$_2$ (citrate) remained at 100% until about 45 hours. At about 52 hours, the removal efficiency of the Pb/Al$_2$O$_3$ decreased to about 83% while at about 56 hours the removal efficiency of the Bi/TiO$_2$ (nitrate) decreased to about 70%. However, the removal efficiency of the Bi/TiO$_2$ (citrate) remained high at about 99% at 52 hours and was at about 97% at about 56 hours. Even after another about 25 hours, the removal efficiency of the Bi/TiO$_2$ (citrate) had not declined to that of the Pb/Al$_2$O$_3$ or the Bi/TiO$_2$ (nitrate). The arsenic content in a spent Bi/TiO$_2$ (nitrate) sample was measured to be 3.1 wt %.

Example 3

Comparison of a Titanium Oxide Adsorbent (TiO$_2$) With a Bismuth Oxide on Titanium Oxide Adsorbent (Bi/TiO$_2$) for Removing Arsine Experimental Conditions:

About 1 cubic centimeter of a titanium oxide adsorbent was loaded into a reactor. A fluid containing about 100 ppmw of arsine in propane was passed through the reactor and over the adsorbent for a period of time at a liquid hourly space velocity ("LHSV") of 10 h$^{-1}$. The fluid was at ambient temperature (25° C.), liquid phase about 220 psig. Arsine was adsorbed onto the adsorbent from the fluid. The experiment was repeated at the same conditions with about 1 cubic centimeter of an adsorbent containing bismuth oxide on titanium dioxide. The results are shown in FIG. 3.

Figure 3:
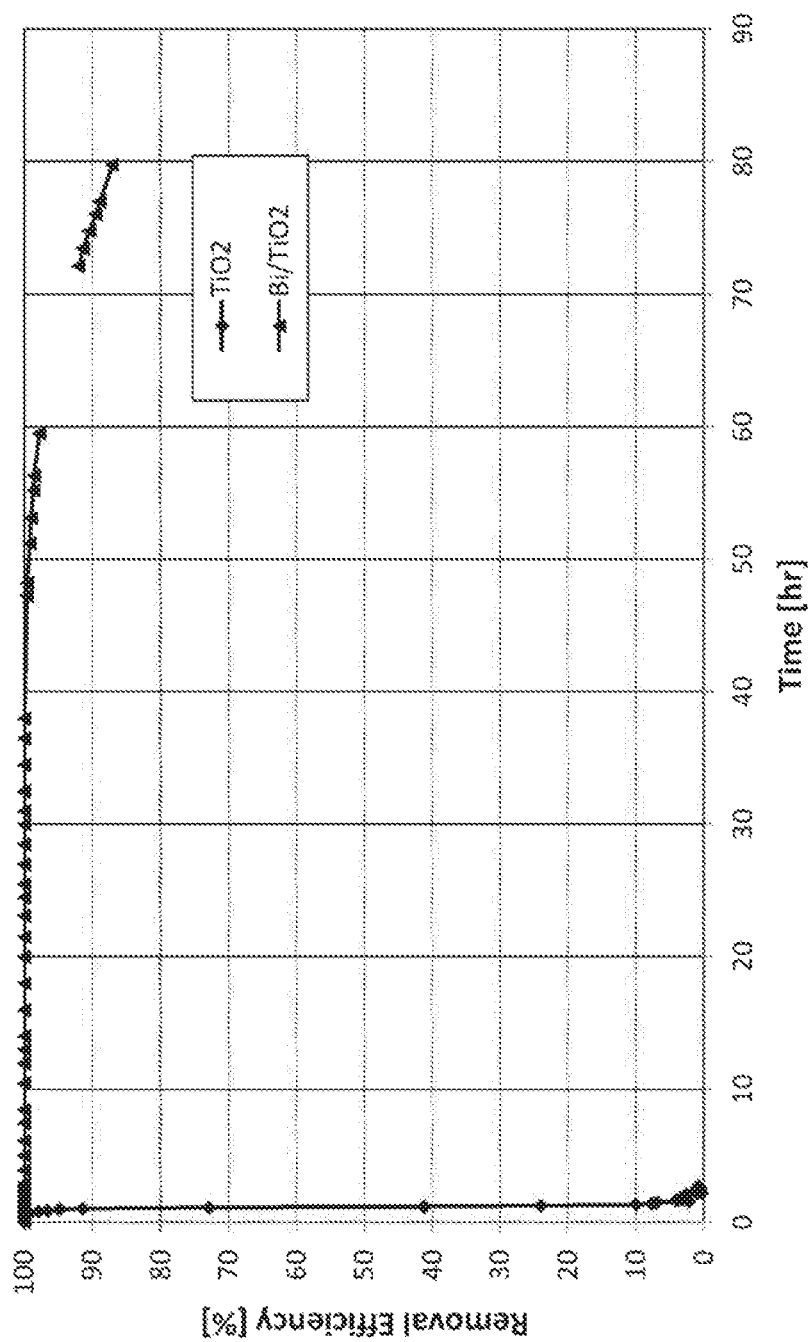
FIG. 3 shows a comparison of a titanium oxide adsorbent with a bismuth oxide on titanium oxide adsorbent for removing arsine in accordance with various example aspects of the disclosure.

As shown in FIG. 3, the removal efficiency (%) of arsine as a function of time of the Bi/TiO$_2$ was significantly higher than the TiO$_2$. The addition of bismuth oxide to titanium dioxide extended the adsorbent life by about 77 hours or more. This example indicates that titanium oxide (TiO$_3$) alone is inactive in removal of arsine front a fluid while a Bi/TiO$_2$ adsorbent system exhibits high activity in arsine capture.

Example 4

Comparison of Bismuth Oxide on Titanium Oxide Adsorbents (Bi/TiO$_2$) With a Lead Oxide on Aluminum Oxide Adsorbent (Pb/Al$_2$O$_3$) (Prior Art) for Removing Arsine Experimental Conditions:

About 1 cubic centimeter of an adsorbent containing about 2 wt % bismuth oxide on titanium dioxide (Bt/TiO$_2$ (2 wt %)) was loaded into a reactor. A fluid containing about 100 ppmw of arsine in propane was passed through the reactor and over the adsorbent for a period of time at a liquid hourly space velocity ("LHSV") of 10 h$^{-1}$. The fluid was at ambient temperature (25° C.), liquid phase about 220 psig. Arsine was adsorbed onto the adsorbent front the fluid. The experiment was repeated at the same conditions with about 1 cubic centimeter of art adsorbent containing about 9.4 wt % bismuth on titanium dioxide (Bi/TiCF (9.4 wt %)), an adsorbent containing about 20 wt % bismuth on titanium dioxide (Bi/TiO$_2$ (20 wt %)) and an adsorbent containing lead oxide on aluminum oxide (Pb/Al$_2$O$_3$ (about 20 wt % PbO)) loaded into the reactor. The results are shown in FIG. 4.

Figure 4:
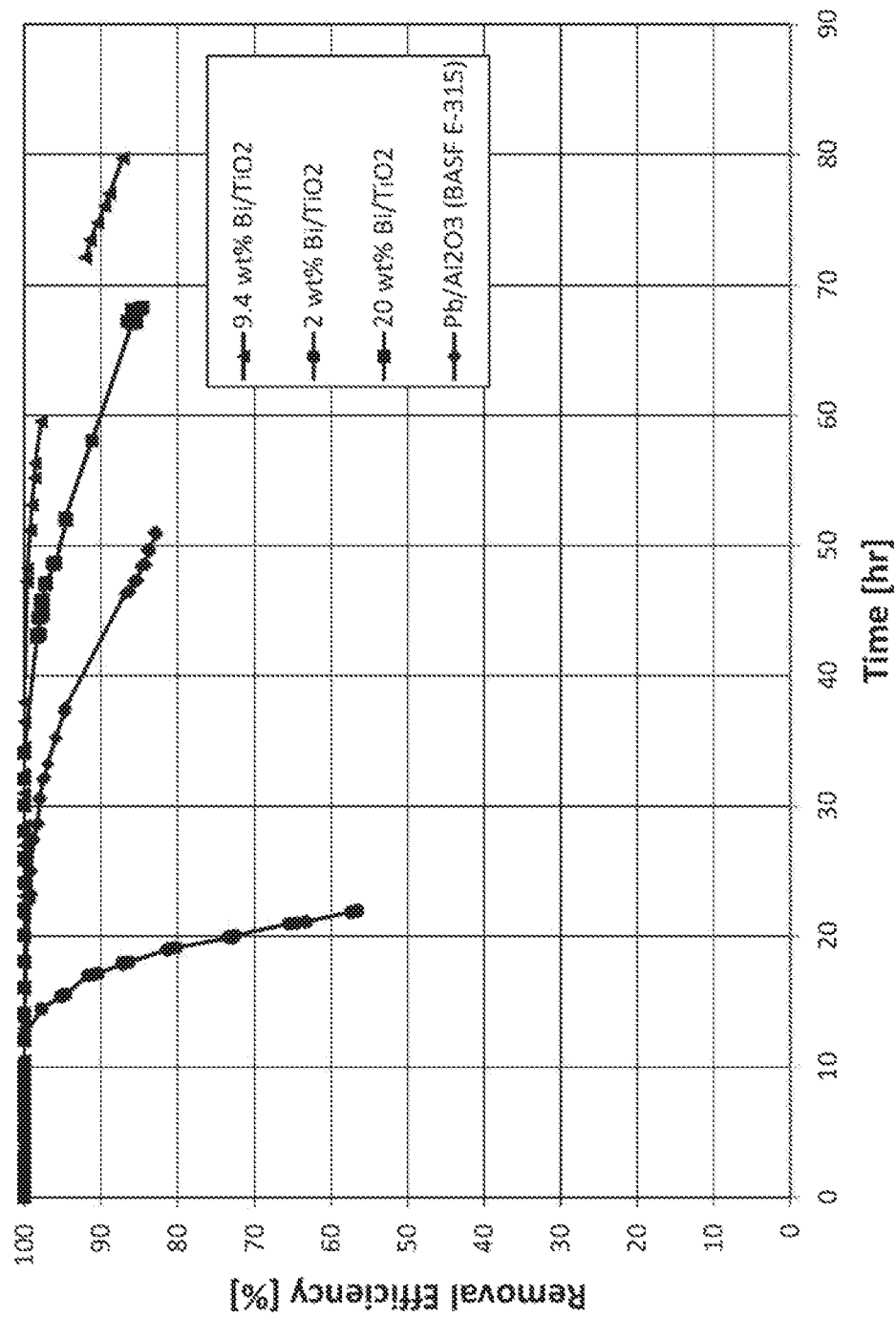
FIG. 4 shows a comparison of bismuth on titanium oxide adsorbents with a lead oxide on aluminum oxide adsorbent for removing arsine in accordance with various example aspects of the disclosure.

As shown in FIG. 4, the removal efficiency (%) of arsine as a function of time was comparable for all adsorbents for about 13 hours. However, thereafter, the removal efficiency of the Bi/TiO$_2$ (2 wt %) began to sharply decline as compared to the other adsorbents. At about 22 hours the removal efficiency of Pb/Al$_2$O$_3$ began to decline while the removal efficiency of the Bi/TiO$_2$ (9.4 wt %) and the Bi/TiO$_2$ (20 wt %) remained at 100% until about 34 hours. Thereafter, the removal efficiency of the Bi/TiO$_2$ (9.4 wt %) remained at 100% until about 45 hours whereas the removal efficiency of the Bi/TiO$_2$ (20 wt %) began to decline at about 35 hours. At about 52 hours, the removal efficiency of the Pb/Al$_2$O$_3$ decreased to about 83% whereas the removal efficiency of the Bi/TiO$_2$ (9.4 wt %) remained high at about 99%. Even after another about 30 hours, the removal efficiency of the Bi/TiO$_2$ (9.4 wt %) had not declined to that of the Bi/TiO$_2$ (20 wt %) or the Pb/Al$_2$O$_3$. The resulting uptake of arsenic in the Bi/TiO$_2$ (20 wt %) and Bi/TiO$_2$ (2 wt %) samples was found to be about 3.7 wt % and about 1.2 wt %, respectively. This finding suggests that a bismuth oxide supported on titanium dioxide adsorbent system is active in arsine removal at a very small loading of the bismuth, for example, at least a Bi content of as low as about 2 wt %.

It is to be understood that the phraseology or terminology used herein is for the purpose of description and not of restriction, such that the terminology or phraseology of the present specification may be interpreted by those of ordinary in the art in light of the teachings and guidance presented herein, in combination with the knowledge of those of ordinary skill in the relevant art(s).

The various aspects disclosed herein encompass present and future known equivalents to the known components referred to herein by way of illustration. Furthermore, while aspects and applications have been shown and described, if will be apparent to those of ordinary skill in the art having the benefit of this disclosure that many more modifications than mentioned above are possible without departing from the inventive concepts disclosed herein.

We claim:

1. A method of adsorbing an arsenic material, comprising: contacting an arsenic-containing fluid with an adsorbent composition, the adsorbent composition comprising a support and a bismuth material, wherein the pores of the support are at least 91% filled by the bismuth material, wherein the arsenic-containing fluid is a hydrocarbon stream and wherein the support comprises a moisture content of about 15% by mass or less.

2. The method of claim 1, wherein the support comprises at least one of a metal oxide, a metalloid oxide or an activated carbon.

3. The method of claim 1, wherein the bismuth material is selected from a group consisting of elemental bismuth and a bismuth compound.

4. The method of claim 1, wherein the bismuth material comprises a bismuth oxide.

5. The method of claim 2, wherein the metal oxide comprises titanium dioxide.

6. The method of claim 1, wherein the arsenic-containing fluid comprises arsine.

7. The method of claim 1, wherein the adsorbent composition comprises a lead content of about 5% by mass or less.

8. The method of claim 1, wherein the adsorbent composition comprises about 0.01% to about 20% by mass of the arsenic material.

9. The method of claim 1, wherein the adsorbent composition comprises about 8% to about 11% by mass of the bismuth material.

10. The method of claim 1, wherein the adsorbent composition has an arsine removal efficiency of about 90% or more as measured by a dry colorimetry method using an arsine analyzer.

11. The method of claim 1, wherein the support comprises a pore size of about 1 Å to about 750 Å.

12. The method of claim 1, wherein the hydrocarbon stream is part of a process selected from a group consisting of a petroleum process, a petrochemical process, a polymerization process, a synthesis gas process and a semiconductor process.

* * * * *